(12) United States Patent
Whitenight et al.

(10) Patent No.: US 8,056,310 B2
(45) Date of Patent: Nov. 15, 2011

(54) CONDITIONER ROLLS HAVING TREAD PATTERN COORDINATED WITH CUTTERBAR CROP DISCHARGE PATTERN

(75) Inventors: Donald R. Whitenight, Orangeville, PA (US); Roger Huggard, Lititz, PA (US); Cecil R. Sudbrack, New Holland, PA (US); Luke J. Harris, Leola, PA (US); Mark D. Layton, Lititz, PA (US)

(73) Assignee: CNH America LLC, New Holland, PA (US)

( * ) Notice: Subject to any disclaimer, the term of this patent is extended or adjusted under 35 U.S.C. 154(b) by 67 days.

(21) Appl. No.: 12/636,084

(22) Filed: Dec. 11, 2009

(65) Prior Publication Data

US 2011/0138763 A1 Jun. 16, 2011

(51) Int. Cl.
*A01D 61/00* (2006.01)
(52) U.S. Cl. .................................................. 56/16.4 C
(58) Field of Classification Search ............... 56/16.4 C, 56/16.4 B, 16.4 R, 14.3
See application file for complete search history.

(56) References Cited

U.S. PATENT DOCUMENTS

| | | | |
|---|---|---|---|
| 880,500 A | | 3/1908 | Ingersoll |
| 981,643 A * | | 1/1911 | Hamilton ..................... 100/176 |
| 1,219,927 A * | | 3/1917 | Dibbets ....................... 100/176 |
| 1,690,828 A * | | 11/1928 | Maxwell .................. 100/162 R |
| 1,868,302 A * | | 7/1932 | Auger ............................ 72/196 |
| RE24,973 E * | | 4/1961 | Griffiths ............................ 56/1 |
| 2,991,611 A * | | 7/1961 | McCarty ........................... 56/1 |
| 3,210,825 A * | | 10/1965 | Johnston ....................... 241/295 |
| 3,284,875 A * | | 11/1966 | Wood ........................... 241/294 |
| 3,488,929 A * | | 1/1970 | Hale ................................. 56/1 |
| 3,513,645 A * | | 5/1970 | Garrett et al. ....................... 56/1 |
| 3,624,987 A * | | 12/1971 | Lausch et al. ................ 56/16.4 C |
| 3,656,284 A * | | 4/1972 | Meek et al. ..................... 56/14.5 |
| 3,712,034 A * | | 1/1973 | Praca ......................... 56/16.4 C |
| 3,732,670 A * | | 5/1973 | Milliken et al. ............ 56/16.4 C |
| 3,747,310 A * | | 7/1973 | Calder ........................ 56/16.4 A |
| 4,075,822 A * | | 2/1978 | Heckley et al. ............. 56/16.4 C |
| 4,127,979 A * | | 12/1978 | Hoch .......................... 56/16.4 C |
| 4,150,524 A * | | 4/1979 | Sawyer ............................... 56/1 |
| 4,242,409 A * | | 12/1980 | Parker ............................ 428/181 |
| 4,445,313 A * | | 5/1984 | Elliott et al. ................ 56/16.4 C |
| 4,539,797 A * | | 9/1985 | McLean ........................ 56/12.3 |
| 4,546,599 A * | | 10/1985 | Cicci et al. ................. 56/16.4 R |
| 4,896,490 A * | | 1/1990 | Grenzebach ................ 56/16.4 R |
| 4,910,947 A * | | 3/1990 | Seymour .................... 56/16.4 R |
| 5,419,106 A * | | 5/1995 | Gemelli ...................... 56/16.4 B |
| 6,050,070 A * | | 4/2000 | Cook ............................. 56/14.1 |
| 6,158,201 A * | | 12/2000 | Pruitt et al. ......................... 56/6 |
| 6,318,055 B1 * | | 11/2001 | Bird .................................. 56/6 |
| 6,360,515 B1 * | | 3/2002 | Cook ............................. 56/14.1 |
| 6,497,087 B1 * | | 12/2002 | Stiefvater et al. ............... 56/16.6 |
| 6,904,741 B2 * | | 6/2005 | Priepke ...................... 56/16.4 C |
| 6,955,034 B1 * | | 10/2005 | Blakeslee et al. .......... 56/16.4 C |
| 6,968,907 B1 * | | 11/2005 | Raper et al. .................... 172/518 |
| 7,021,038 B2 * | | 4/2006 | Priepke ...................... 56/16.4 C |
| 2005/0204715 A1 * | | 9/2005 | Nickel et al. ............... 56/16.4 B |
| 2007/0022726 A1 * | | 2/2007 | Ferre et al. ..................... 56/14.1 |
| 2007/0079592 A1 * | | 4/2007 | Pruitt et al. ................. 56/16.4 C |

* cited by examiner

*Primary Examiner* — Arpad Fabian-Kovacs
(74) *Attorney, Agent, or Firm* — Patrick M. Sheldrake; Michael G. Harms

(57) ABSTRACT

A conditioner roll tread pattern comprising a plurality of equally circumferentially spaced ribs separated by grooves extending across the axial length of the conditioner roll. The ribs are angled relative to the axial centerline, either with a fixed positive/negative angle or a continuously varying angle alternating between positive and negative extremes. The conditioner roll is configured to work in conjunction with a paralley disposed roll of similar tread pattern configuration, reversed end-for-end so that the ribs of one roll intermesh with the grooves of the adjacent roll. The location of the transition points at which the angle reverses along the axial length are coordinated with the transverse locations of converging and diverging crop flows being discharged from a forwardly disposed rotary disc cutterbar in a manner that results in a crop mat having more uniform thickness being discharged from the conditioner.

14 Claims, 4 Drawing Sheets

DIRECTION OF MACHINE TRAVEL

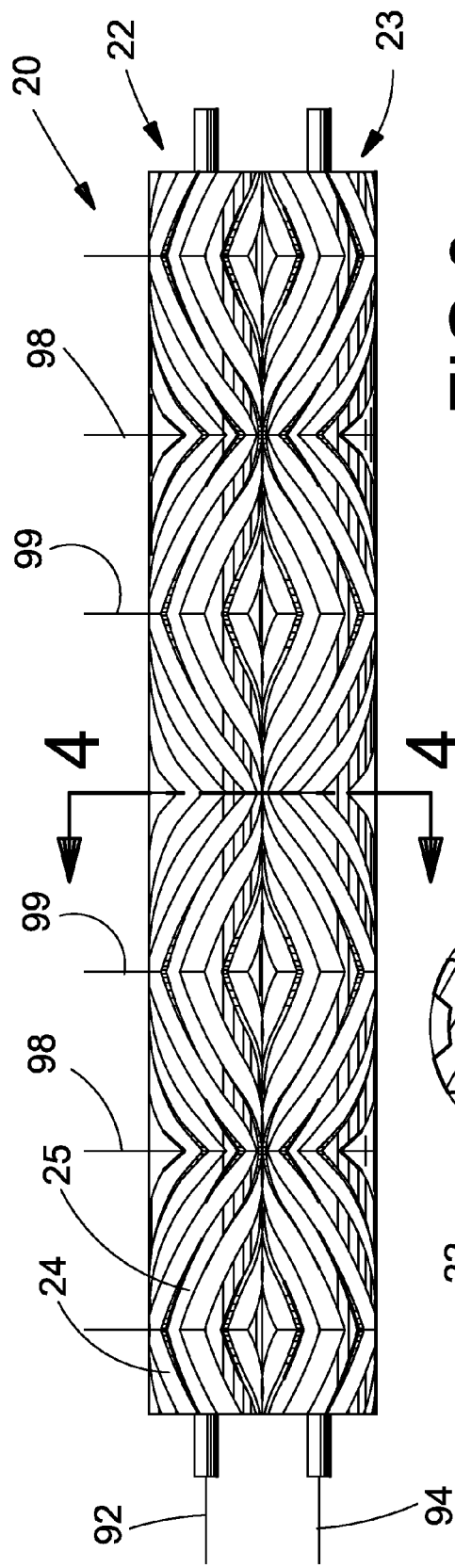
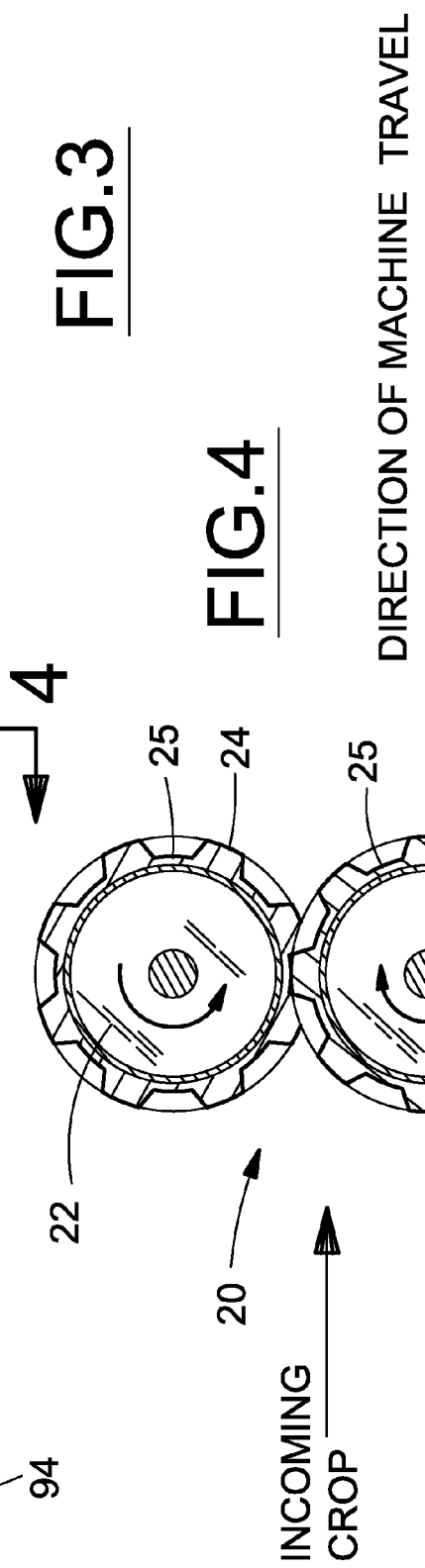
FIG.3
FIG.4
DIRECTION OF MACHINE TRAVEL
INCOMING CROP

US 8,056,310 B2

CONDITIONER ROLLS HAVING TREAD PATTERN COORDINATED WITH CUTTERBAR CROP DISCHARGE PATTERN

BACKGROUND OF THE INVENTION

The present invention relates generally to agricultural mower-conditioners, and more particularly relates to a crop header in which the conditioning apparatus is configured to improve windrow consistency when used with a rotary disc cutterbar.

Windrower mower-conditioner combinations are well known and typically comprise a cutting mechanism, a conditioning unit, and one or more deflectors to arrange the cut and conditioned crop material into a windrow. The windrower mower-conditioner combination is generally a self-propelled unit, but may also be configured to be propelled by a separate tractor. Typically, a standing crop is cut by a rotating disc cutting mechanism disposed along a leading edge of the combination. The severed crop material is then directed to a conditioner unit that processes the crop for faster drying. The conditioner unit typically comprises a pair of intermeshing rolls that crush the crop material passing therebetween. For background information on the structure and operation of some typical disc mower-conditioners, reference is made to U.S. Pat. No. 5,778,647, issued to McLean et al., the descriptive portions thereof being incorporated herein by reference.

One problem with counter-rotating discs is that crop material tends to be non-uniformly discharged from the cutterbar; crop material tends to be concentrated between converging cutters (ones in which the knife cutting edges approach each other during rotation) leaving a much less dense area in the crop mat between pairs of diverging rotary cutters. Rather than a desirable crop material mat of near-uniform thickness being fed into the conditioner rolls, the crop material mat directed toward the rolls will be arranged in several smaller windrow-like streams of crop. Conventional conditioner rolls having a single chevron, spiral roll, or similar large scale tread patterns do not laterally disperse the crop mat to a significant degree to overcome the bunched crop streams inherent with a disc cutterbar. This results in discharge of a windrow of non-uniform mat thickness which is less than ideal for crop drying.

It would be advantageous to have a conditioner roll tread pattern with a repeating pattern coordinated with the position of the converged crop discharges from a rotary disc cutterbar that would laterally disperse the crop mat discharged from the cutterbar leaving a crop mat having a more uniform thickness in the resultant windrow. Further advantages would be realized by a conditioner roll tread pattern design that balances lateral dispersion of crop incoming material thereby minimizing thrust loads imposes on the roll bearings and the tendency for crop material to be concentrated at the outboard ends of the rolls and restricted by the header side walls side.

SUMMARY OF THE INVENTION

Accordingly, the present invention, in any of the embodiments described herein, may provide one or more of the following advantages:

It is an object of the present invention to provide a conditioner roll tread pattern that is optimized for use with a disc cutterbar whereby an incoming crop mat of inconsistent density created by alternating patterns of diverging and converging cutters is laterally dispersed to create a more uniform crop mat density upon discharge from the conditioner mechanism.

It is a further object of the present invention to provide a conditioner roll tread pattern that laterally disperses an incoming crop mat in a balanced manner thereby reducing the tendency of crop material becoming concentrated adjacent the outboard ends of the conditioner rolls where it may become entangled with the header housing structure.

It is a further object of the present invention to provide a conditioner roll tread pattern that laterally disperses an incoming crop mat in a balanced manner to minimize thrust loading imposed on conditioner roll bearings.

It is a still further object of the present invention to provide a conditioner roll tread pattern that may be efficiently formed on the surface of the conditioner rolls.

It is a still further object of the present invention to provide a conditioner roll tread pattern that laterally disperses an incoming crop mat while effectively crushing the material comprising the incoming crop mat for effecting crop conditioning.

It is a still further object of the present invention to provide a conditioner roll tread pattern for a conditioner mechanism that is durable in construction, inexpensive of manufacture, carefree of maintenance, easily assembled, and simple and effective to use.

These and other objects are achieved in accordance with the instant invention by providing a conditioner roll tread pattern comprising a plurality of equally circumferentially spaced ribs separated by grooves extending across the axial length of the conditioner roll. The ribs are angled relative to the axial centerline, either with a fixed positive/negative angle or a continuously varying angle alternating between positive and negative extremes. The conditioner roll is configured to work in conjunction with a parallel disposed roll of similar tread pattern configuration, reversed end-for-end so that the ribs of one roll intermesh with the grooves of the adjacent roll. The location of the transition points at which the angle reverses along the axial length are coordinated with the transverse locations of converging and diverging crop flows being discharged from a forwardly disposed rotary disc cutterbar in a manner that results in a crop mat having more uniform thickness being discharged from the conditioner.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3 is a detailed view of the conditioner rolls one used in a typical mower-conditioner header showing one embodiment of a tread pattern of the present invention;

FIG. 4 is a section view of the conditioner rolls shown in FIG. 3 taken along cut line 4-4.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
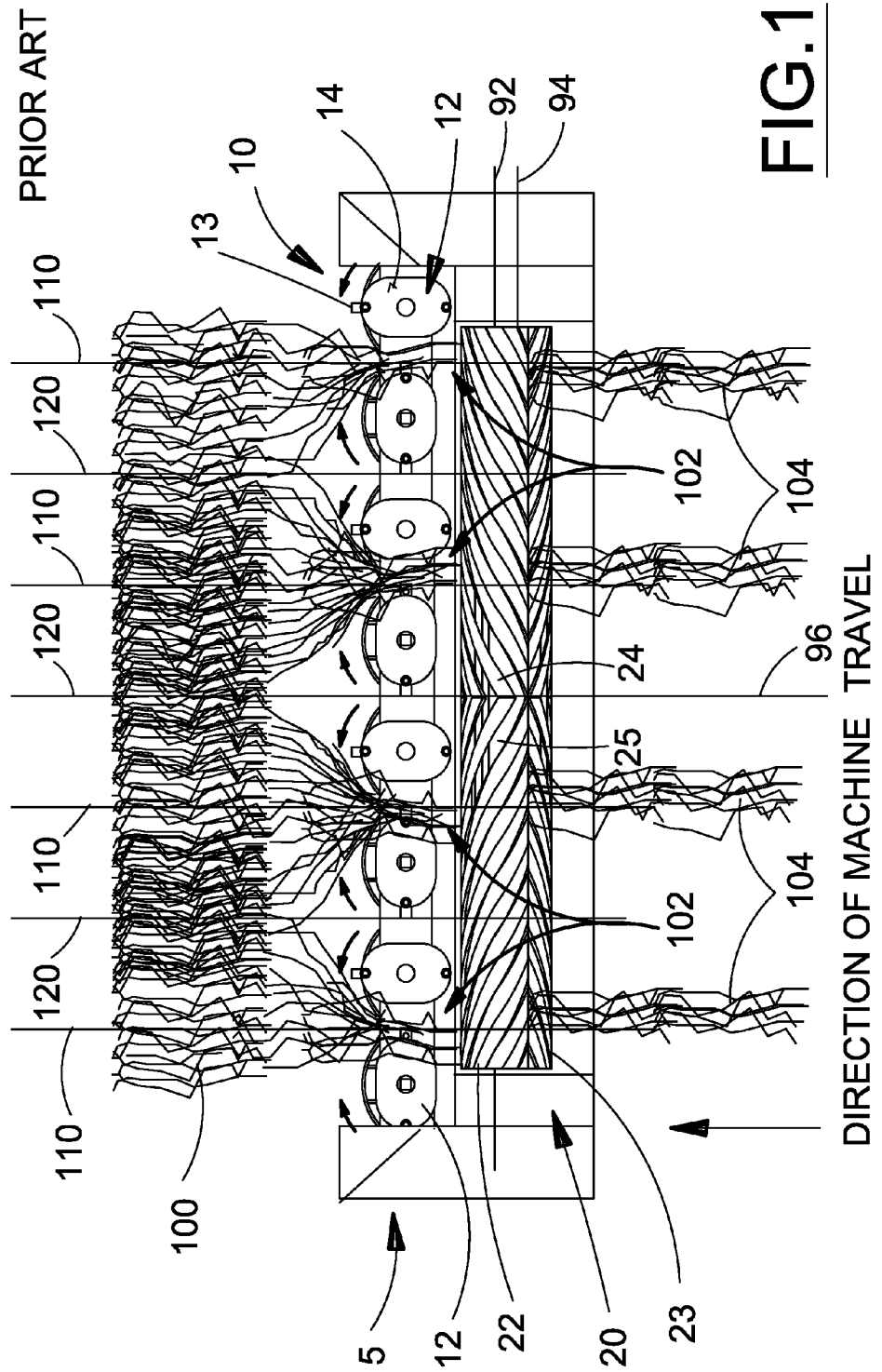
FIG. 1 is a partial plan view of a mower-conditioner header of the type on which the present invention is useful showing a conventional conditioner roll tread pattern and the resultant crop material flow.

Referring now to FIG. 1, a portion of a typical mower-conditioner header 5 is presented having a forwardly disposed rotary disc cutterbar 10 and a rearwardly disposed conditioner mechanism 20. The cutterbar 10 comprises a plurality of transversely spaced-apart disc cutters 12 operable to sever standing crop material 100 by an impact action of knives 13 connected to rotating heads 14. Motive power is provided from a prime mover via a power take-off drive (not shown). The individual disc cutters 12 are interconnected by a driveline to distribute motive power to each disc cutter and to coordinate the rotational position of each cutter mechanism thereby preventing contact between the knives of adjacent cuttings. Each disc cutter 12 is rotated in a direction opposite to that of the adjacent cutter(s). As a result, rotation of adjacent pairs of cutters 12 may be either converging (knife travelling opposite to direction of machine travel) or diverging (knife travelling in same direction as direction of machine travel) based on movement of crop material as it is severed from the ground. As the cutterbar passes through a field of standing crop, the mat of severed crop material tends to be concentrated between disc cutters rotating in a converging direction, shown as concentrated crop streams 102 along convergent paths 110, while the mat is less concentrated along paths between divergently rotating disc cutters, shown as divergent path 120.

It is to be noted that the crop flows in the accompanying figures are illustrative in nature, showing crop streams 102 as discrete paths of crop material. In practice, crop material is discharged along the entire transverse width of a rotary disc cutterbar and it is the density or concentration of the mat of crop material that varies dependent upon whether it passes between convergent or divergently rotating disc cutters. Also noteworthy is that while a rotary disc cutterbar is used to illustrate the advantages of the present invention, any crop severing cutterbar that produces a crop mat having a non-uniform thickness or density across its width, especially a crop mat in which the non-uniformity follows a predictable pattern, will benefit from the crop movement provided by the present invention.

The conditioning mechanism 20 is mounted rearwardly of the cutterbar 10 to receive and condition crop material severed by the cutterbar 10. The conditioning mechanism 20 includes a pair of elongate, intermeshingly cooperable, generally vertically spaced-apart conditioner rolls 22, 23 arranged transversely on the header. The conditioner rolls 22, 23 condition the crop by a crushing action as the severed crop material passes between the rolls. Each roll 22, 23 is rotatably supported adjacent opposing sides of the header. Rotation of the rolls 22, 23 is coordinated for counter-rotational movement by a conditioner gearbox 29, usually connected at one end of the rolls and powered by the tractor. The normal method of conditioner roll construction includes an intermeshing lug 24 and groove 25 tread design on the roll surfaces, typically accomplished by reversing the pattern on one roll end-for-end relative to the other roll. The tread design is most easily formed from a resilient material, such as an elastomer.

Headers incorporating cutter and conditioning mechanism of the type shown may be connected to and propelled by a tractor specifically adapted for use with such headers, commonly referred to as a self-propelled windrower, or incorporated into a mower-conditioner implement for propulsion by a general purpose agricultural tractor. The description herein is based upon a mower-conditioner header typical of an agricultural windrower. Those skilled in the art will recognize the usefulness of the instant invention on other mower-conditioner platforms. For background information on the structure and operation of an exemplar rotary disc cutterbar, reference is made to U.S. Pat. No. 5,778,647, issued to McLean et al., the descriptive portions thereof being incorporated herein by reference.

The conditioner rolls 22, 23 shown in FIG. 1 features a surface tread pattern of ribs 24 and grooves 25 in the form of a single chevron group extending circumferentially around each roll surface. The tread pattern is angled relative to the axial centerline 92, 94 of the rolls, the absolute value of the angle being generally equal on either side of the roll transverse midpoint. As the condition rolls rotate, the interaction of the intermeshing ribs and grooves of the tread pattern with the crop material tends to urge the crop material toward the transverse center 96 of the conditioner. A reverse orientation of the tread pattern is undesirable as it would tend to urge crop material outwardly toward the ends of the conditioner where entanglement with the supporting bearings and drive mechanism would occur. As the concentrated crop streams 102 of the crop material mat exit the cutterbar and enter the known conditioner mechanism, the streams are shifted slightly toward the center of the header, but little is done to disperse the concentrations in the crop material mat. The result is a mat of crop material exiting the conditioner mechanism having discrete concentrations 104 of crop material rendering the mat of crop material non-uniform in nature and less than ideal for crop drying.

Figure 2:
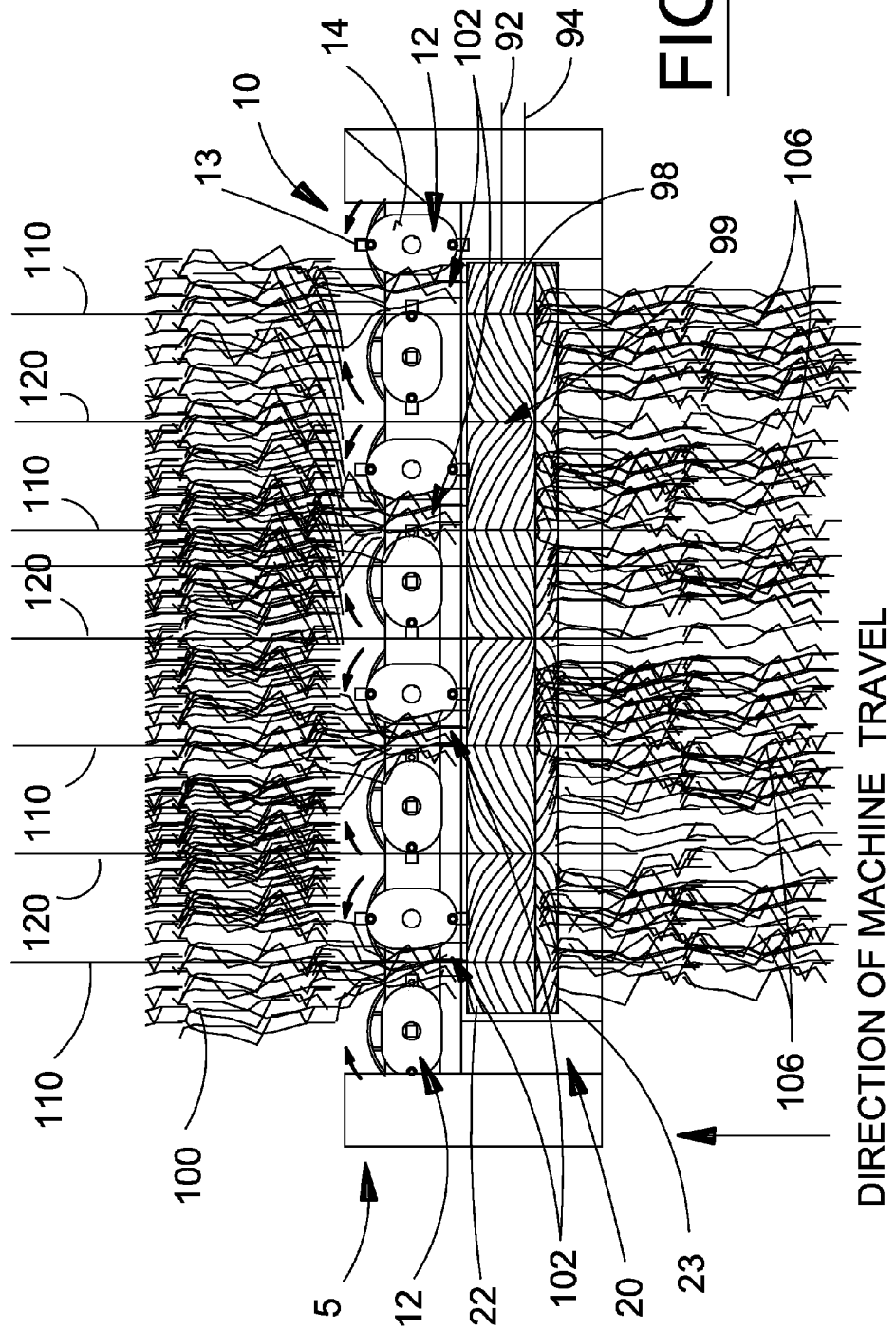
FIG. 2 is a partial plan view of the mower-conditioner header shown in FIG. 1 incorporating one embodiment of the conditioner roll tread pattern of the present invention and illustrating the improvement in crop material flow.

Now referring to FIGS. 2 through 4, the present invention improves the crop processing ability of a rotary disc cutter type of mower-conditioner by providing a tread pattern on the conditioner rolls that laterally distributes the concentrated streams of crop material discharged from a typical rotary disc cutterbar or other similar cutting apparatus producing a non-uniform crop material mat, so that the resulting mat of crop material discharged from the conditioner is more uniform in thickness and density thereby improving crop drying. One embodiment of the improved tread pattern comprises multiple chevron pattern groups formed by a plurality of ribs 24 and grooves 25 extending transversely along the length of the conditioning roll wherein the "apex" 98 of each chevron group is aligned with one of the concentrated crop streams 102 exiting the cutterbar. In order to provide multiple apexes 98 along the length of the conditioner rolls, the angles of the ribs and grooves with respect to the roll rotational centerline axis 92, 94 must also be reversed midway between each apex 98. This second location, referred to herein as the vertex 99, aligns generally between two adjacent cutters that are divergently rotating. The effect of the multiple chevron groups creates a zig-zag appearance in the tread pattern.

As two conditioner rolls (generally an upper 22 and a lower 23 roll) having tread patterns that are reversed from one another comprise a typical conditioner device with an intermeshing tread pattern, the apexes 98 are arranged to point in the direction of crop movement between the rollers at each concentrated crop stream path 102. This chevron tread arrangement causes the incoming crop stream to be laterally displaced in both transverse directions from a plane perpendicular to the rotational axis 92, 94 defined by the apexes 98 of the conditioner rolls. The apex locations 98 are referred to herein as transition zones. The effect on the concentrated stream 102 of crop material is to disperse the crop material laterally, reducing the concentration in the crop streams 102 and creating a dispersed crop mat 106 that is more uniform across its width. Similarly, crop material is laterally converged toward the vertexes 99 as the conditioner rolls rotate. The vertexes are arranged behind divergently rotating disc cutters 12 where the density of the crop material mat is less than that behind convergently rotating cutters. Optimally, the number of apex positions on the conditioner rolls will equal the number of converging disc cutter locations, four as shown in FIG. 2.

Figure 5:
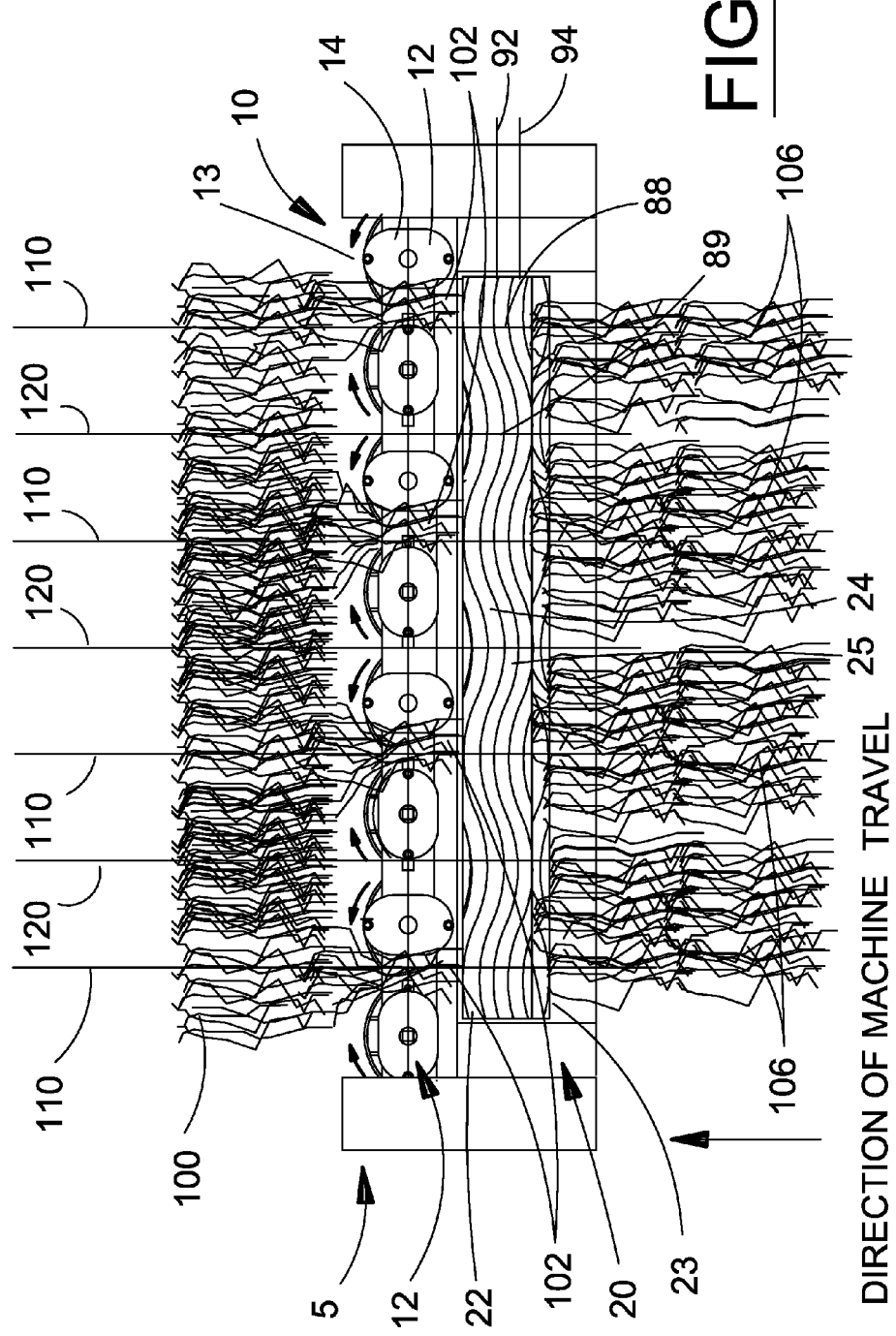
FIG. 5 is a partial plan view of the mower-conditioner header benefiting from the present invention showing a second embodiment of the conditioner roll tread pattern.

Now referring to FIG. 5, an alternate tread pattern embodiment is shown wherein the angular chevron structure is replaced by ribs and grooves arranged in an interconnected series of alternately inverted arcuate shapes having a slope relative to the axis of the conditioner roll reversing at least once along the axial length of the conditioner roll, the absolute value of the slope gradually decreasing to zero, passing therethrough, and gradually increasing upon approaching and passing said transition zone moving in a direction parallel to the axial length of each roll 22, 23. One example might be an oscillating wave pattern (i.e., a sinusoidal wave) along the axial length of the rolls 22, 23. The intermeshing ribs 24 and grooves 25 are angled with respect to the roll centerlines and the angles, but the angle various continuously with position along the length of the roll. Apex and vertex locations of the chevron patterned rolls are replaced with apogee 88 and perigee 89 locations, respectively, wherein a line tangent to the curve of the ribs and grooves is parallel to the rotational axis of the rolls. Positioning of the apogee and perigee locations of the conditioner rolls relative to the converging and diverging crop material streams exiting the cutterbar are as with the chevron patterned rolls. The apogees 88 are aligned with the converging cutter locations 110 while the perigees 89 are aligned with the diverging cutter locations 120 with similar effect; the angled portions of the ribs and grooves extending laterally away from the apogee positions laterally disperse the crop material away from the apogee location, just as with the apex on the chevron pattern rolls. The effect on the crop material stream passing through the conditioner rolls is similar to the earlier described transition zones in that the concentrated streams are laterally dispersed from the transition zone location to improve the crop distribution laterally across the discharged crop mat.

Those skilled in the art will recognize that a variety of conditioner roll tread patterns that are capable of laterally urging crop material flow as the crop passes between the rolls may be used. The pattern must be configured so that lateral crop movement occurs at a plurality of positions along the length of the conditioner rolls as crop material mat passes between the two parallel, counter-rotating rolls and that positions from which the lateral crop movement is divided (i.e., crop material is urged laterally away from the transition zone position) must be positioned in the header to receive concentrated streams of crop material directed from converging rotation disc cutters. By so configuring the conditioner roll tread pattern relative to the cutterbar, the result mat of crop material discharged from the conditioner device will have improved consistency and density.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. An agricultural mower-conditioner header comprising:
    a cutting mechanism arranged transversely on the header to define a cutting width for cutting and feeding the crop material rearward the cutting mechanism including a plurality of space-apart disc cutters wherein each adjacent pair of cutters is configured for counter-rotation creating a plurality of rotating pairs of disc cutters configured for convergent rotation;
    a pair of elongate, intermeshing conditioner rolls disposed in adjacent parallel relationship rearwardly of said cutting mechanism for receiving said crop mat from said cutting mechanism, said conditioner rolls each having a plurality of circumferentially spaced ribs extending across the axial length of said rolls; and
    a tread pattern formed by said ribs on each of said pair of conditioner rolls, said tread pattern cyclically varying relative to location along the axial length of each roll for more than one cycle, said tread pattern being reversed end-for-end on one of said pair of rolls thereby enabling intermeshing relationship of said conditioner rolls, said cyclical pattern further having at transition zones in which the rib pattern transitions from having a positive slope to a negative slope with respect to the transverse axis, the transitions zones being horizontally positioned and aligned along the cutting width of the header between the centers of corresponding disc pairs configured for convergent rotation crop from the corresponding disc pairs configured for convergent rotation.

2. The header of claim 1, wherein the crop mat trailing said at least one convergently rotating pair of cutters corresponding to said crop mat zone of greater density, the position of the crop mat trailing said at least one divergently rotating pair of cutters corresponding to said crop mat zone of lesser density.

3. The header of claim 1, wherein said ribs comprise a plurality of adjacent chevron groups extending along the axial length of said conditioner rolls, each said chevron group extending circumferentially around the conditioner roll and having a apex, each said apex positioned along the axial length of the rolls and aligned transversely within horizontal gaps between the adjacent converging disc pairs.

4. The header of claim 3, wherein the number of said chevron groups is equal to the number of convergently rotating pairs of cutters.

5. The header of claim 4, wherein said tread pattern is formed from an elastomeric material.

6. The header of claim 1, wherein said ribs comprise a interconnected series of alternately inverted arcuate shapes having a slope relative to the axis of the conditioner roll reversing at least once along the axial length of the conditioner roll, the absolute value of the slope gradually decreasing to zero, passing therethrough, and gradually increasing upon approaching and passing said transition zone moving in a direction parallel to the axial length of each roll, wherein the transitions zones of the rib pattern having a zero absolute value of slope are aligned and with a horizontal gap between the convergent disc cutters.

7. The header of claim 6, wherein the number of wherein the number of said transition zones is equal to the number of convergently rotating pairs of cutters.

8. An apparatus for use in an agricultural harvester, the mechanism for feeding, conditioning, and arranging severed crop material on the ground comprising:
 a cutting mechanism for cutting and feeding the crop material rearwardly, the cutting mechanism including a plurality of space-apart disc cutters wherein each adjacent pair of cutters is configured for counter-rotation creating a plurality of rotating pairs of disc cutters configured for convergent rotation;
 a conditioning mechanism having a pair of elongate, intermeshing rolls disposed in adjacent parallel relationship rearwardly and in a crop flow path of said cutting mechanism for conditioning crop between said rolls, said conditioner rolls each having a plurality of circumferentially spaced ribs extending across the axial length of said rolls; and
 a tread pattern formed by said ribs on each of said rolls, said tread pattern cyclically varying relative to location along the axial length of each roll for more than one cycle, said tread pattern being reversed end-for-end on one of said rolls relative to the other thereby enabling intermeshing relationship of said tread pattern, said tread pattern further having transition zones in which the rib pattern transitions from having a positive slope to a negative slope with respect to the transverse axis, the transitions zones being horizontally positioned and aligned along the cutting width of the header between the centers of corresponding wherein interaction of said intermeshing ribs urges crop material passing therebetween laterally away from said transition zone, said tread pattern being configured such that the transition zones are positioned to receive crop mat from said corresponding disc pair configured for convergent rotation.

9. The apparatus of claim 8, wherein crop mat trailing said at least one disc pair configured for convergent rotation having greater thickness relative to the crop mat trailing said at least one divergently rotating pair of cutters.

10. The apparatus device of claim 9, wherein the number of wherein the number of said transition zones is equal to the number of convergently rotating pairs of cutters.

11. The apparatus of claim 8, wherein said ribs comprise a plurality of adjacent chevron groups extending along the axial length of said conditioner rolls, each said chevron group extending circumferentially around the conditioner roll and having a apex, each said apex positioned along the axial length of the rolls to receive each of said zones of greater density of the crop mat.

12. The apparatus of claim 10, wherein said ribs comprise a interconnected series of alternately inverted arcuate shapes having a slope relative to the axis of the conditioner roll reversing at least once along the axial length of the conditioner roll, the absolute value of the slope gradually decreasing to zero, passing therethrough, and gradually increasing upon approaching and passing said transition zone moving in a direction parallel to the axial length of each roll, wherein the transition zones are located directly rearward of a horizontal gap between the disc pairs within a crop flow path from the corresponding disc pairs.

13. The apparatus of claim 10, wherein said tread pattern is formed from an elastomeric material.

14. An agricultural mower-conditioner header comprising
 a cutting mechanism arranged transversely on the header to define a cutting width for cutting and feeding the crop material rearward into the header, said cutting mechanism producing a crop mat having zones of crop density along the transverse width of the cutting mechanism alternating between lesser density and greater density; the cutting mechanism including a plurality of space-apart disc cutters wherein each adjacent pair of cutters is configured for counter-rotation creating a plurality of rotating pairs of disc cutters configured for convergent rotation;
 a pair of elongate, intermeshing conditioner rolls disposed in adjacent parallel relationship rearwardly of said cutting mechanism for receiving said crop mat from said cutting mechanism, said conditioner rolls each having a plurality of substantially equally circumferentially spaced ribs of uniform circumferential width extending across the axial length of said rolls; and
 a tread pattern formed by said ribs on each of said pair of conditioner rolls, said tread pattern cyclically varying relative to location along the axial length of each roll for more than one cycle, said tread pattern being reversed end-for-end on one of said pair of rolls thereby enabling intermeshing relationship of said conditioner rolls, said cyclical pattern further having zones in which the rib pattern transitions from having a positive slope to a negative slope with respect to the transverse axis, the transitions zones being horizontally positioned and aligned along the cutting width of the header between the centers of corresponding disc pairs configured for convergent rotation wherein interaction of said intermeshing ribs urges crop material passing therebetween laterally away from said transition zone, said tread pattern being configured such that the transition zones are positioned to receive crop from the corresponding disc pairs configured for convergent rotation supply a crop zone of greater density from said cutting mechanism whereby said crop mat being discharged from said conditioner device and deposited on the ground is of more uniform density than said crop mat being fed into said conditioner device.

* * * * *